United States Patent
Smith

(10) Patent No.: US 8,407,114 B2
(45) Date of Patent: Mar. 26, 2013

(54) MONEY IS TIME: INNOVATIVE DETERMINATION AND CALCULATION OF PAID TIME OFF

(76) Inventor: Michelet Michael Smith, Mesa, AZ (US)

( * ) Notice: Subject to any disclaimer, the term of this patent is extended or adjusted under 35 U.S.C. 154(b) by 435 days.

(21) Appl. No.: 12/474,414

(22) Filed: May 29, 2009

(65) Prior Publication Data

US 2010/0106630 A1    Apr. 29, 2010

Related U.S. Application Data

(60) Provisional application No. 61/197,618, filed on Oct. 29, 2008.

(51) Int. Cl.
*G06F 15/02*    (2006.01)
*G07C 1/10*    (2006.01)
*G06Q 10/00*    (2012.01)
*G06Q 40/00*    (2012.01)

(52) U.S. Cl. .................. 705/32; 705/2; 705/4
(58) Field of Classification Search .............. None
See application file for complete search history.

(56) References Cited

U.S. PATENT DOCUMENTS

| | | | |
|---|---|---|---|
| 6,604,080 B1* | 8/2003 | Kern | 705/4 |
| 2002/0184148 A1* | 12/2002 | Kahn et al. | 705/40 |
| 2004/0088234 A1* | 5/2004 | Kelly | 705/32 |
| 2008/0195512 A1* | 8/2008 | Klebanoff et al. | 705/32 |
| 2008/0243652 A1* | 10/2008 | Dracup et al. | 705/32 |

OTHER PUBLICATIONS

Jessica Yang, "Paid Time Off from Work", http://www.salary.com/Articles/ArticleDetail.asp?part=par088, available online Nov. 12, 2004.*

* cited by examiner

*Primary Examiner* — Faris Almatrahi
*Assistant Examiner* — Ariel Yu

(57) ABSTRACT

A method to manage employee benefits (100) using a computer (30) in order to reduce employee cost. The method includes establishing an employee cash account (2) on a database (8) for disposing on a medium (31). Benefit hours (4) of the employee are accrued over a period of time to provide earned benefit hours (40). The employee's wage rate (10) during the period of time (6) is multiplied by the earned benefit hours (40) to provide a monetary benefit (12). The monetary benefit (12) is added to the employee cash account (2). When the employee uses the cash account (2), at least a portion of the monetary benefit (12) is subtracted from the employee cash account (12).

5 Claims, 12 Drawing Sheets

Prior Art

| A | B | C | D | E | F | G |
|---|---|---|---|---|---|---|
| Action | Time Period | Salary Rate (e.g., Dollars per Hour) | Accrued Benefit Hours | Use Employee Account Hours | Hours Transferred to Employee Account | Employee Account Value (Hours) |
| Hours Earned | 1 | $10.00 | 2 | 0 | 2 | 2 |
| Hours Earned | 2 | $10.00 | 2 | 0 | 2 | 4 |
| Hours Earned | 3 | $10.00 | 2 | 0 | 2 | 6 |
| Balance | 4 | $15.00 | 0 | 0 | 0 | 6 |
| Hours Used | 5 | $15.00 | 0 | 2 | -2 | 4 |

FIG. 1

Prior Art

| Time Period | Action | Monetary Benefit (e.g., Dollars) | Employee Account Value (e.g., Dollars) |
|---|---|---|---|
| 1 | Hours Earned | $0.00 | NA |
| 2 | Hours Earned | $0.00 | NA |
| 3 | Hours Earned | $0.00 | NA |
| 4 | Balance | $90.00 | $90.00 |
| 5 | Hours Used | ($30.00) | $60.00 |

FIG.1A

| A | B | C | D | H | E | F | G |
|---|---|---|---|---|---|---|---|
| Action | Time Period | Salary Rate (e.g., Dollars per Hour) | Earned Benefit Hours | Hours Taken | Monetary Amount (e.g., Dollars) | Monetary Benefit (e.g., Dollars) | Employee Account Value (e.g., Dollars) |
| Set Up Employee Cash Account | 0 | $10.00 | 0 | | $0.00 | $0.00 | $0.00 |
| Hours Earned | 1 | $10.00 | 2 | | $0.00 | $20.00 | $20.00 |
| Hours Earned | 2 | $10.00 | 2 | | $0.00 | $20.00 | $40.00 |
| Hours Earned | 3 | $10.00 | 2 | | $0.00 | $20.00 | $60.00 |
| Used Employee Benefits | 4 | $10.00 | | 2 | ($20.00) | $0.00 | $40.00 |

FIG. 4

| A | B | C | D | E | F | G | H |
|---|---|---|---|---|---|---|---|
| Action | Time Period | Salary Rate (e.g., Dollars per Hour) | Earned Benefit Hours | Paid-Time-Off (Hours) | Monetary Amount (e.g., Dollars) | Monetary Benefit (e.g., Dollars) | Employee Account Value (e.g., Dollars) |
| Set Up Employee Cash Account | 0 | $0.00 | 0 | 0 | $0.00 | $0.00 | $0.00 |
| Hours Earned | 1 | $10.00 | 2 | 0 | $0.00 | $20.00 | $20.00 |
| Hours Earned | 2 | $10.00 | 2 | 0 | $0.00 | $20.00 | $40.00 |
| Hours Earned | 3 | $10.00 | 2 | 0 | $0.00 | $20.00 | $60.00 |
| Balance | 4 | $15.00 | 0 | 0 | $0.00 | $0.00 | $60.00 |
| Hours Used | 5 | $15.00 | 0 | 2 | $30.00 | $0.00 | $30.00 |

FIG. 7

| A | B | C | D | E | F | G |
|---|---|---|---|---|---|---|
| Action | Time Period | Salary Rate (e.g., Dollars per Hour) | Earned Benefit Hours | Monetary Amount (e.g., Dollars) | Monetary Benefit (e.g., Dollars) | Employee Account Value (e.g., Dollars) |
| Set Up Employee Emergency Account | 0 | $0.00 | 0 | $0.00 | | $0.00 |
| Hours Earned | 1 | $10.00 | 2 | $0.00 | $20.00 | $20.00 |
| Hours Earned | 2 | $10.00 | 2 | $0.00 | $20.00 | $40.00 |
| Hours Earned | 3 | $10.00 | 2 | $0.00 | $20.00 | $60.00 |
| Balance | 4 | $15.00 | 0 | $0.00 | $0.00 | $60.00 |
| Emergency Expense | 5 | $15.00 | 0 | $5.00 | $0.00 | $55.00 |

FIG. 10

MONEY IS TIME: INNOVATIVE DETERMINATION AND CALCULATION OF PAID TIME OFF

This non-provisional application claims the benefit of a prior-filed provisional application having the application No. 61/197,618.

BACKGROUND OF THE INVENTION

The present invention relates, in general, to employee benefits and, more particularly, to determining the value of the employee benefits.

Benefits offered by employers are typically earned over time and commonly determined based on the employee's tenure with an employer. Employee benefits may include a combination of annual leave, sick leave, holidays, vacation, military leave and compensation time, to name a few. These employee benefits are frequently provided in the form of paid-time-off. Further, the employee benefits can include spending accounts such as health spending accounts and other designated spending accounts.

Employers typically have a combination of policies and contracts in place to establish the benefits offered to their employees. Many of these policies and contracts include limitations such as the portion of benefits that can carry over to the next calendar year. Further, employee benefits of exempt and non-exempt employees can vary based on union contract negotiations and other reasons. Federal statutes, such as 29 U.S.C. §§201-219, govern certain labor practices of employers and is referred to as "The Fair Labor Standards Act" (FLSA). Generally, the FLSA does not establish benefits. Instead, the FLSA establishes minimum wage, overtime pay, recordkeeping, and youth employment standards affecting Federal, State, and local government and the private sector employees. In contrast, the "Federal Family and Medical Leave Act" (FMLA) requires employers to allow employees time off as outlined in the Code of Federal Regulations, i.e., 29 CFR §825.207). However, the time off or leave provided by FMLA is generally not paid. Since the statutes normally do not include employee benefits, employers are generally given broad latitude in providing benefits to their employees.

FIG. 1 is a table that illustrates employee transactions of a commonly used technique based on hours for providing employee benefits. Column A of FIG. 1 identifies the transactions or actions. Column B of FIG. 1 identifies a time period for each transaction in chronological order from the top to the bottom of the table. As illustrated in column D of FIG. 1, the employee earns a benefit of two hours over each of the time periods 1, 2 and 3. In column G, a balance of 6 hours is shown for the time period 6 labeled 4. In period 5, the employee uses two hours and the resulting account balance as shown at the bottom of column G is 4 hours. Even though period 5 indicates a new wage rate of $15 per hour, the employee's wage rate is not a consideration in determining the remaining account balance of 4 hours. Instead, the account balance remains in hours.

FIG. 1A, in contrast to FIG. 1, illustrates a monetary valuation of the employee benefits. Instead of hours as previously depicted in FIG. 1, FIG. 1A uses monetary value (e.g., dollars). The time periods and actions illustrated in FIG. 1A are identical to those shown in FIG. 1. Based on the salary rate of $15 per hour, from column C of FIG. 1, the period 4 balance (i.e., 6 hours under column G) as shown in column K of FIG. 1A is $90. In period 5, the employee uses 2 hours valued at $15 per hour as illustrated in column E. Hence, $30 is the value of 2 hours used by the employee. The balance at the bottom of FIG. 1A is $60. The employee uses two hours valued at $30 of their earned benefit as shown in period 5. After using the $30 or two hours of employee benefit at the wage rate of $15 per hour, the value of the balance is $60. This balance does not accurately represent the value of the employee benefits, because all the hours are valued at the wage rate of the most recent work period. The wage rate of each pay period over time is not applied to the benefits earned for the pay periods.

Hence, there is a need to improve the method of establishing value to employee benefits.

SUMMARY OF THE INVENTION

In one general aspect, the present invention provides a method of managing employee benefits by setting up a cash account for an employee. A balance of the cash account is disposed on a medium. Benefit hours are accrued over a first period of time to provide earned benefit hours. The hourly wage rate is multiplied by the earned benefit hours to provide a monetary benefit. The monetary benefit is added to the cash account. When a portion of the benefits are used, the balance is determined by subtracting the portion of the employee benefits from the cash account.

In another general aspect, the invention satisfies the foregoing need by providing a method for determining benefits. This method establishes a cash account for an employee. The cash account has a balance disposed on a medium. Paid time off is accrued to provide earned benefit hours. A first hourly wage is multiplied by the earned benefit hours to provide a monetary benefit. The monetary benefit is added to the employee cash account. Using a portion of the benefits includes multiplying a second hourly wage by time-taken-off to provide a monetary amount. The balance is calculated by subtracting the monetary amount from the cash account.

In yet another general aspect, the invention satisfies the foregoing need by providing a method for determining employee benefits. This method establishes an emergency account for an employee and has a balance for disposing on a medium. Emergency hours of the employee are accrued over a first period to provide earned benefit hours. A first hourly wage is multiplied by the earned benefit hours to provide a monetary benefit. The monetary benefit is added to the emergency account. On using a portion of the emergency account, a second hourly wage is multiplied by time taken off to provide a monetary amount. The cash balance is obtained by subtracting the monetary amount from the emergency account.

BRIEF DESCRIPTION OF THE DRAWINGS

FIG. 1 is a table to illustrate the determination of benefits based on employee account hours earned;

FIG. 1A is a table of the monetary valuation of the employee account hours of FIG. 1.

FIG. 4 is a table of an example for managing employee benefits;

FIG. 7 is a table of an example of another embodiment for determining benefits;

FIG. 10 is a table of an example of yet another embodiment for determining employee benefits.

DETAILED DESCRIPTION OF THE DRAWINGS

Generally, the present invention is an improved method of managing employee benefits. The improvement includes at least establishing a more accurate method of assigning value to employee benefits. First, instead of accounting for employee benefits in hours, an employee cash account is initially set up for each new employee. Second, the employee benefit in hours is converted into a monetary value (e.g., dollars). Unlike other methods, the monetary value in dollars of the benefit is established by using the wage rate at the time the benefit is accrued. The earned benefit is added to the employee cash account. When a portion of the benefit is used, the balance of the cash account is determined by subtracting a monetary amount equivalent to the used portion of benefits from the cash account. The monetary amount of the used portion is determined by applying the employee wage rate at the time the benefit is used. This method provides employers with more control over their costs and the benefits they provide to their employees. This is because accrued benefits are valued at the time of accrual. The balance of the cash account is placed on a medium. The medium can include a computer screen, a paystub and the like. In one embodiment, the employer can adjust the employee cash account by setting up the account to earn interest over a particular time period. The interest rate can be modified based on the employer's profit or established goals.

Figure 2:
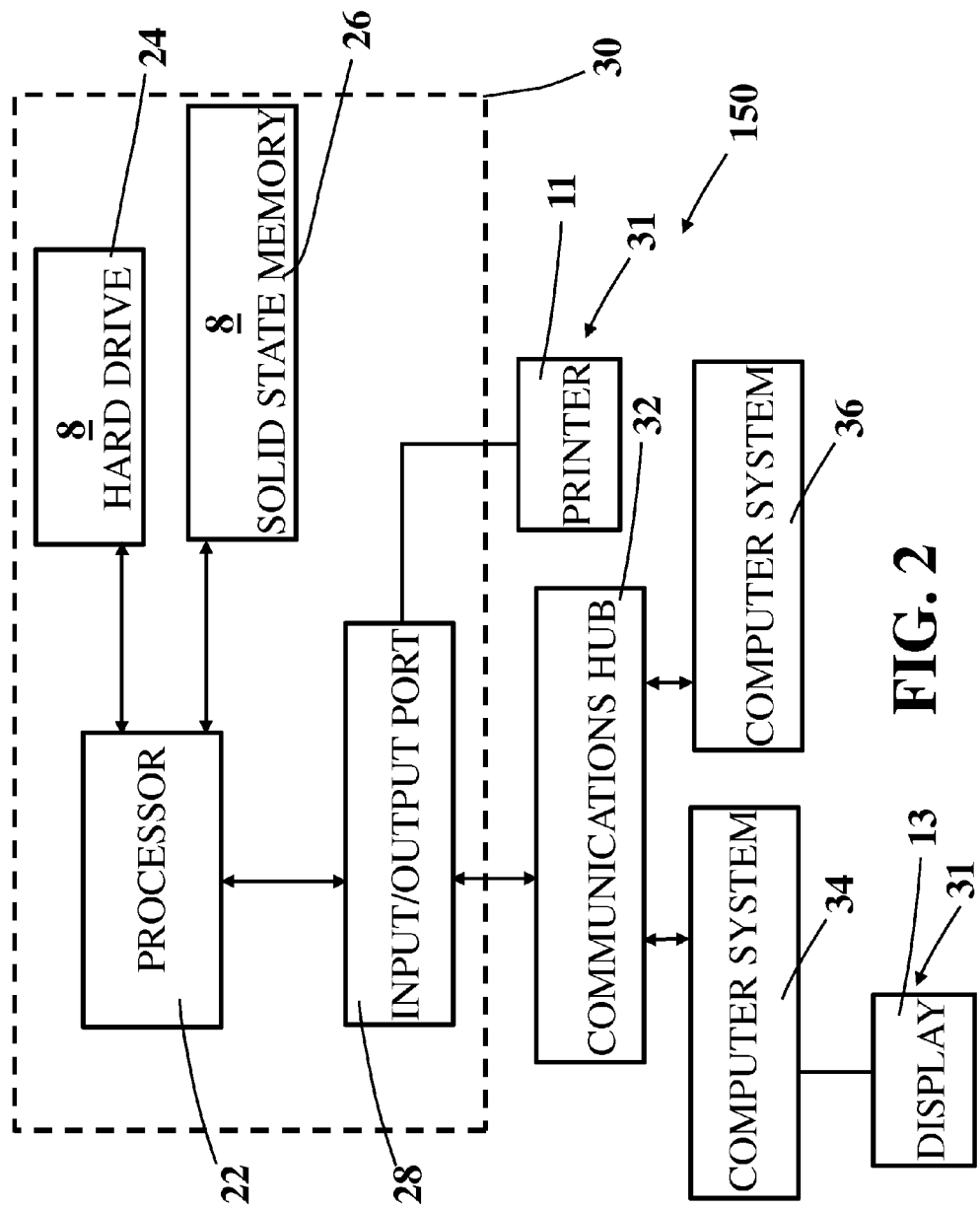
FIG. 2 is a block diagram of a computer and network system for storing and executing instructions.

The present invention will be better understood from a reading of the following detailed description, taken in conjunction, with the accompanying drawing figures, in which like reference numbers designate like elements and in which:

As shown in FIG. 2, employers typically maintain a central database 8 on a computer system and network 150 to store and organize information related to its employee records. The database 8 is accessed and controlled by the employer using application software or computer program(s) running on a computer 30. The database 8 is physically disposed on a mass storage device. The database 8 can be organized as a relational database, flat file, or other organized structure of related records.

The computer system and network 150 is shown in FIG. 2 can be used to host and access an internet-based website. The computer system 30 is a general purpose computer including a central processing unit or processor 22, mass storage device such as a hard drive 24, solid state memory 26, and an input/output port 28. The input/output port 28 may be a high speed Ethernet connection to a communication hub 32. Payroll information is placed on a medium 31 such as using a printer 11 for printing on a paystub 29. The medium 31 can further include displaying on a computer screen or display 13. The printer 11 and display 13 can be connected directly or indirectly to the input/output port 28. The communication hub 32 can be an open architecture system such as the world-wide-web, commonly referred to as the internet. Computer systems 34 and 36 can be configured as shown for the computer system 30 and can also be connected to the communication hub 32, which allows communication among computers 30, 34, and 36.

In FIG. 2, the computers 30, 34, and 36 can be physically located in any location with access to a modem or communication link to the communications hub 32. For example, computer 30 can be a central server at an organization's home office. Computers 34 and 36 can be located in any office, retail space in any state, new construction site connected by cell phone, or a hotel room, just to name a few.

The computer 30 runs application software which can be used to host one or more websites. Each website can include one or more web pages for viewing information and for receiving information from the user. The information displayed on each website is generally stored on the hard drive 24, or other mass storage device accessible to the computer 30. Users operating from computers 34 and 36 from any location can, via the communication hub 32, can log into the website over the internet hosted by computer 30 to view information and enter information via the website. For example, an employee can access benefit information such as benefits by using a display or computer screen 13 connected to the computer 34.

As will be described further, a database or flat file is provided on the hard drive 24. The database 8 can contain at least information related to employees of an organization. Users of computers 34 and 36 can open the employee benefits website on computer 30 and make requests to see the employee related information. The computer 30 can retrieve the employee information from the database 8 and can display the information, for example, on the web pages for any remote users. The users can obtain information and make decisions about employee salary and benefits. With proper authorization, the users can add, delete, and update the information displayed on the web pages. The new and updated information is saved back to the database 8 for future reference by the same user or other users.

Figure 3:
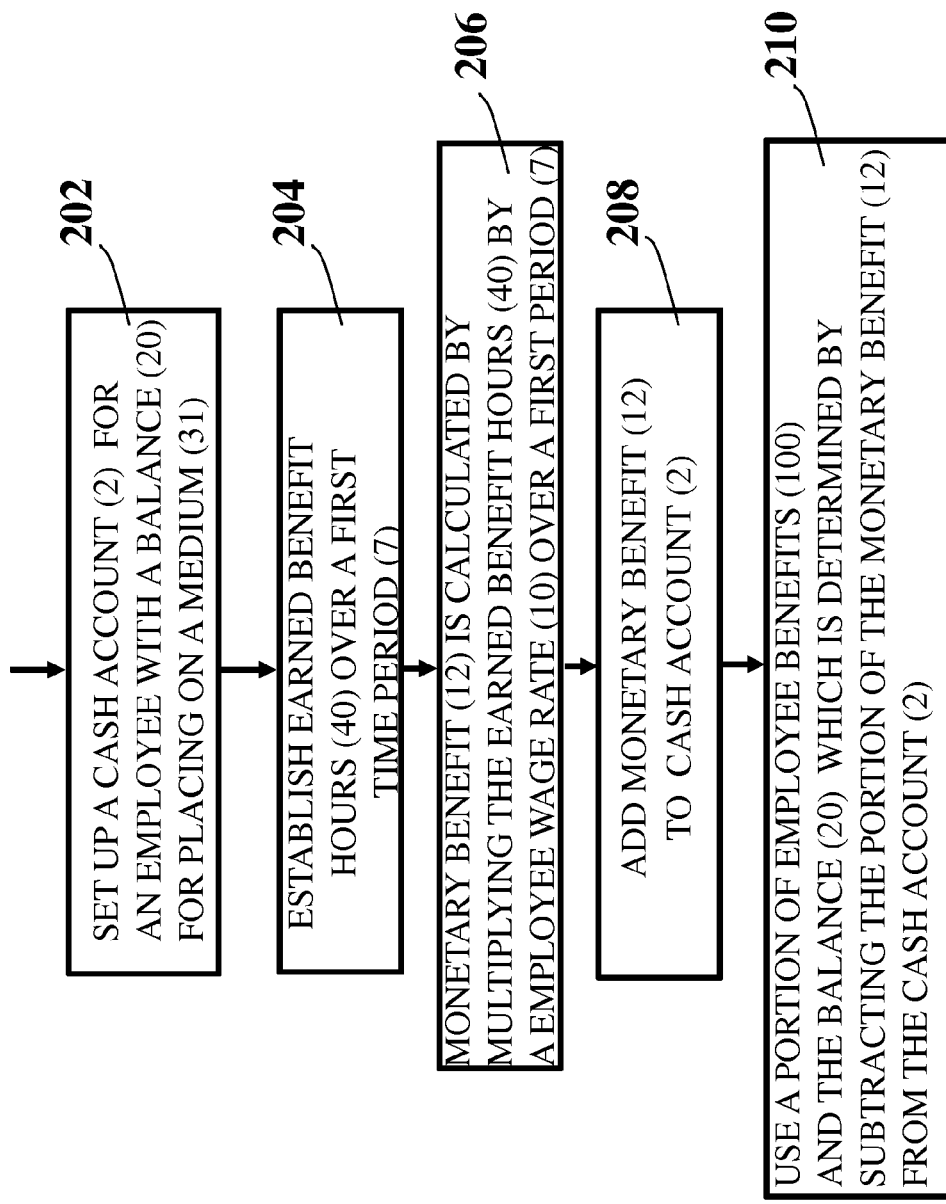
FIG. 3 is a block diagram of the steps for managing employee benefits.

FIG. 3 is a block diagram that illustrates the steps for managing employee benefits 100 through a central database 8. In step 202, an employee account or cash account 2 having a balance 20 is established based on monetary amount (e.g., dollars) and entered in the database 8. The balance 20 can be placed on a medium 31 such as using the printer 11 (See FIG. 5) for printing on a paystub 29 (See FIG. 5). The medium 31 can further include displaying on a computer screen or display 13 (See FIG. 5). Hence, employee benefits 100 are dispersed using the employee cash account 2. In step 204, the period of time 6 can include a calendar month, a week, and any pay period adopted by an employer. The period of time 6 can include any one of a plurality of time periods. One time period of the plurality that occurs prior to another time period is referred to as a first period of time 7. The employee benefit hours 4 are accumulated over an increment or a first period of time 7 to provide earned benefit hours 40 in the database 8. The quantity of earned benefit hours 40 can be a function of a predetermined weighted factor such as the employee's longevity with an organization. In step 206, the earned benefit hours 40 are converted in the database 8 to establish a monetary benefit 12, which has material worth based on a medium of exchange such as dollars. The monetary benefit 12 is calculated by multiplying the earned benefit hours 40 by an employee wage rate 10 over the first time period 7 the employee benefit hours 4 are accumulated. A product of the multiplication is a referred to as the monetary benefit 12 and is stored in the database 8. In step 208, the monetary benefit 12 is added to the cash account 2 and stored in the database 8. In step 210, the employee uses a portion of the employee benefits 100. Thus, the cash account 2 is reduced by subtracting the used portion of the monetary benefit 12 from the cash account 2 and stored as a balance 20 in the database 8. The steps 204 through 210 can be repeated over a plurality of time periods 6. In another embodiment (as shown in FIG. 4), a monetary amount 38 is calculated by taking the product of the hours taken 44 and the wage rate 10, which typically can increase from the earlier first time period 7 to a later or second time period 9.

FIG. 4 is an example of the steps indicated in the block diagram shown in FIG. 3. The actions or transactions depicted in column A of the table in FIG. 4 are chronologically laid out from the table's top to bottom. These transactions, shown by time increments or periods 6, are labeled 0 through 4 in column B of FIG. 4. The employee benefits 100 are managed using the employee cash account 2 set up at with the balance 20 of $0.00 as shown near the top of column G. In the period 6 labeled 1, employee benefit hours 4 are accrued or accumulated to generate earned benefits hours 40 as shown in column D. The monetary benefit 12 of $20.00, in column F, is established by multiplying the most current time period 6 wage rate 10 of $10 per hour, shown in column C, by the two earned benefit hours 40. The monetary benefit 12 of $20.00 is added to the employee cash account 2 as shown in column G. Over the each of the following time periods 6 labeled 2 and 3 of FIG. 4, the employee accumulates two hours having a monetary benefit 12 of $20.00 for each of the respective time periods 6. Hence, as shown in column G, the balance 20 of the employee cash account is $60.00. It is important to note the monetary benefit 12 calculation uses the most current wage rate 10 of $10 per hour as shown in column C. In the time period 6 labeled 4, the employee uses $20.00 of their cash account 2. In one embodiment, the hourly wage 10 is multiplied by the number of hours taken 44 (Column H) to generate the monetary amount 38 of $20.00, as shown in column E. The monetary amount 38 is subtracted from the cash account 2. Hence, the balance 20 of the employee cash account 2 is $40.00 or $60.00 minus $20.00. In yet another embodiment, the employers can provide accrued interest (not shown) on the balance of the employee cash account 2. The accrued interest can be established based on work goals. For example, the work goals can be based on the employer's profit for the year. If the employer's profit is above a particular level then accrued interest is added to the employee cash account 2. the year. If the employer's profit is above a particular level then accrued interest 42 is added to the employee cash account 2.

Figure 5:
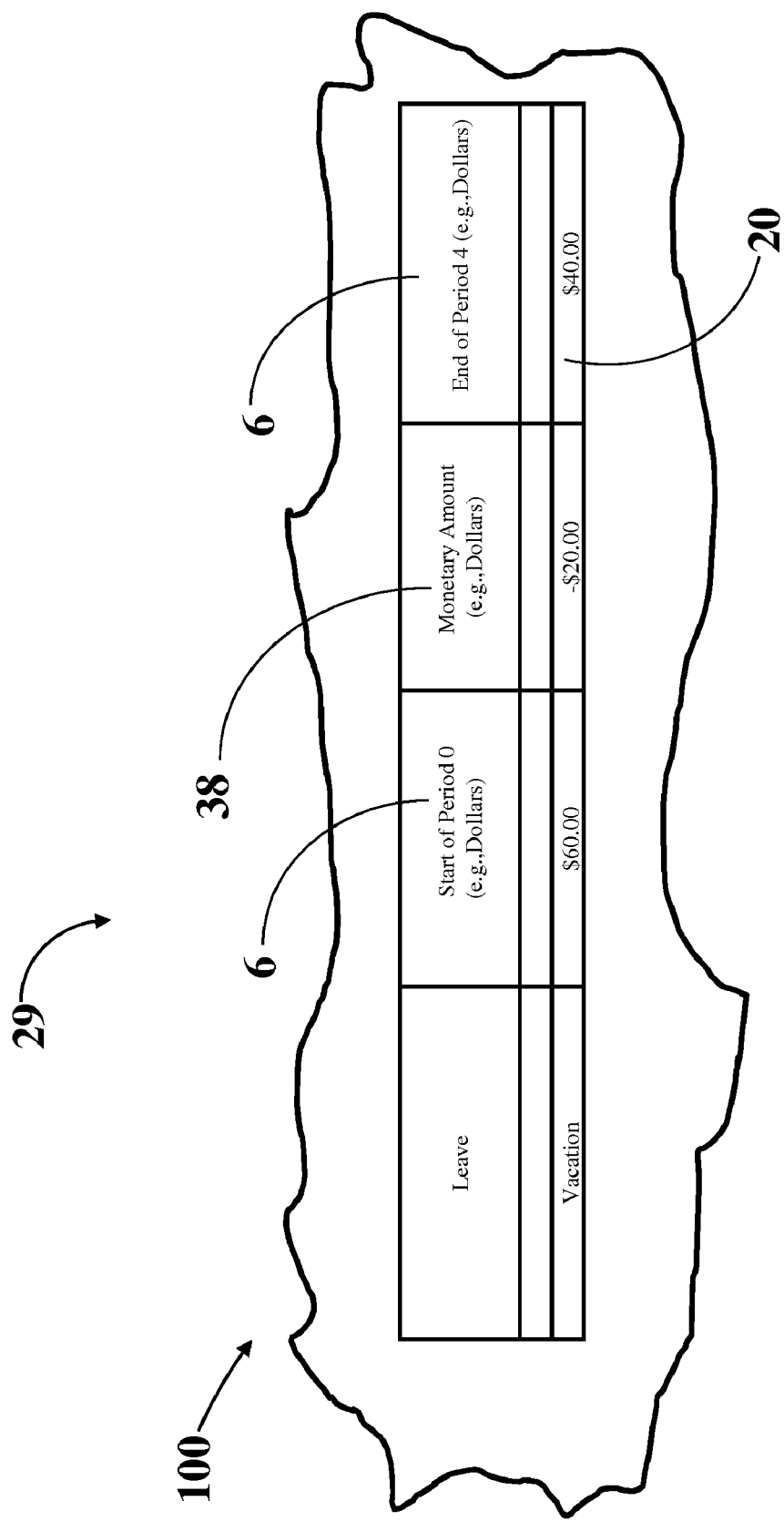
FIG. 5 is a diagram depicting vacation on a portion of a paystub.

FIG. 5 depicts a portion of a medium 31 such as a paycheck or paystub 29 from the example illustrated in FIG. 4. In FIG. 5, the employee benefit 100 takes the form of vacation and is shown in dollars at the beginning and end of the time periods 6, which are labeled period 0 to period 4. The paystub 29 indicates that the monetary amount 38 of $20 is used and the balance 20 of vacation is $40. It should be noted that the date of the beginning time period 6 of each succeeding paystub 29 is the day after the ending time period 6 of the preceding paystub 29.

Figure 6:
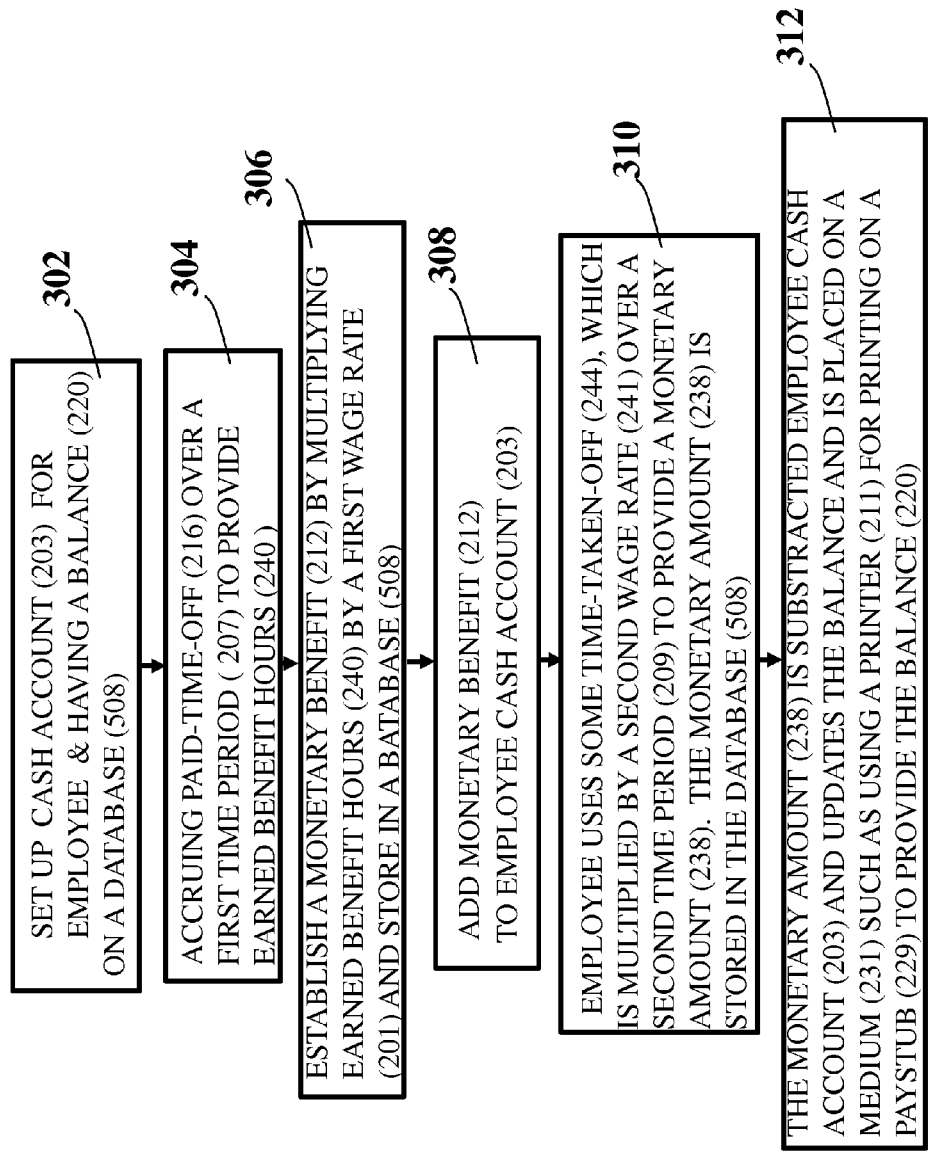
FIG. 6 is a block diagram of another embodiment of the steps for determining benefits.

FIG. 6 is a block diagram illustrating the steps for determining benefits 200. In step 302, an employee account or cash account 203 having monetary value (e.g., dollars) is established having a balance 220 on a database 508 (similar as shown in FIG. 2). The cash account 203 is based on monetary value such as dollars. Employee benefits 200 are set up to be dispersed using the employee cash account 203. The balance 220 can be placed on a medium 231 such as using a printer 211 for printing on a paystub 229. The medium 231 can further include displaying on a computer screen or display 213. In step 304, a paid-time-off 216 is accrued or accumulated over a period or increment of time 205 to provide earned benefit hours 240 in the database 508. The period of time 205 or first time period 207 can be established as discussed under FIG. 3. The quantity of earned benefit hours 240 can be a function of a predetermined weighted factor such as the employee's longevity with an organization. In step 306, the paid-time-off 216 is converted into a monetary benefit 212, which is based on a currency value. The monetary benefit 212 can be calculated by multiplying earned paid-time-off 216 by an employee's first wage rate 201. Monetary benefit 212 is calculated over a particular period of time 205 and is stored in the database 508. In step 308, the monetary benefit 212 is added to the employee cash account 203 and stored in the database 508. In step 310, the employee uses a portion of the employee benefits 200. A time-taken-off 244 by the employee is converted to a monetary amount 238 by multiplying the time-taken-off 244 by a wage rate 245 called a second wage rate 241 over a second time period 209. The result of the multiplication of the time-taken-off 244 and the first wage rate 201 is the monetary amount 238 and is stored in the database 508. In step 312, the employee cash account 203 is reduced by subtracting the monetary amount 238 from the employee cash account 203 and is stored as the balance 220 on the database 508. The steps 304 through 312 can be repeated over a plurality of time periods 205.

FIG. 7 illustrates by example the steps of the block diagram shown in FIG. 6. The events or actions in column A of the table in FIG. 7 are laid out chronologically similar to those of FIG. 4. The paid-time-off 216 is determined using an employee cash account 203, which is set up with the balance 220 of $0.00 as shown in column H. In a time period 205 labeled 1, the employee accumulates two earned benefit hours 240 as shown in column D. The monetary benefit 212 of $20.00, in column G, is established by multiplying the most current time period 205 by the wage rate 245 of $10 per hour, shown in column C, by the two accumulated earned benefit hours 240. The wage rate 245 is the salary per hour an employee receives. Further, the wage rate 245 can describe the wage rate the employee receives over an earlier or later time periods 205 and is referred to as a first 201 and second 241 wage rate, respectively. The monetary benefit 212 of $20.00 is added to the employee cash account 203 as shown in column H. Over the following time periods 205 labeled 1, 2 and 3 in FIG. 6, the employee earns two hours having the monetary benefit 212 of $20.00 for each of the respective time periods. Hence, as shown in column H, the total of the employee cash account is $60.00. It is important to note that the calculation for the monetary benefit 212 uses the most current wage rate 245 as shown in column C. In the time periods 205 labeled 4 and 5, the wage rate 245, can be called the second wage rate 241, and is now $15.00 per hour. It is important to note that the second wage rate 241 of $15.00 per hour is greater than the first wage rate 201 of $10 per hour as discussed in this paragraph. In the time period 205 labeled 5 of column E, the employee uses two hours of paid-time-off 216. The monetary amount 238 of $30.00, column G, is calculated by multiplying the two hours of paid-time-off 216 by a second wage rate 241 of $15.00 per hour. The balance 220 of the employee cash account 203 in column H is $30.00, which is the $60.00 of the cash account 203 minus $30.00 of the monetary amount 238.

Figure 8:
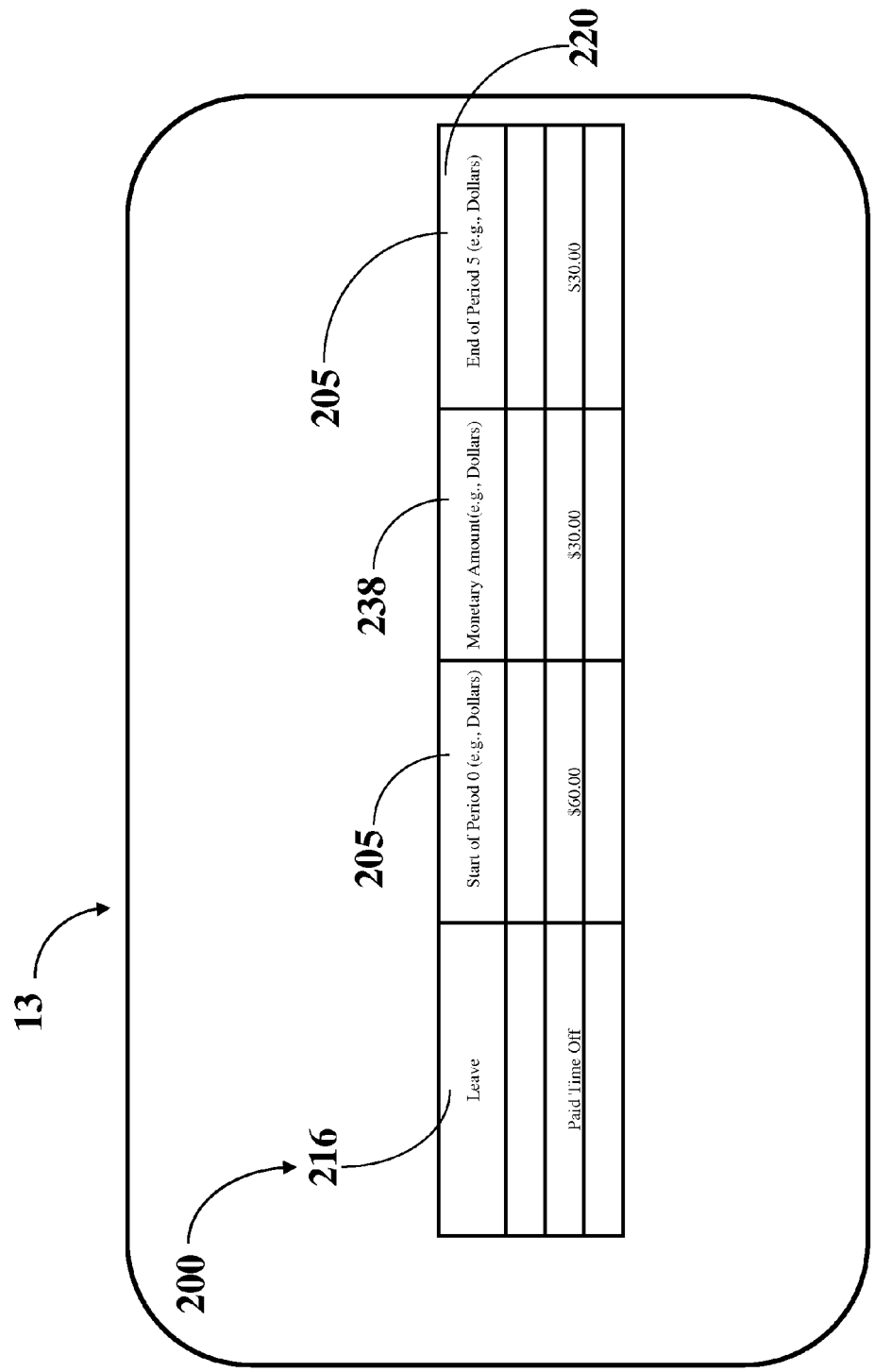
FIG. 8 is a diagram depicting paid-time-off on a portion of a computer screen.

FIG. 8 depicts a portion of a medium 231 such as a computer screen 213 from the example shown in FIG. 7. In FIG. 8, the employee benefit 200 is in the form of paid-time-off 216 and is shown as monetary value or dollars over a time period 205 from period 0 to period 5. The computer screen 213 indicates that $30 is used, and the balance 220 of paid-time-off 216 is $30. It should be noted that the date of the beginning pay or time period 205 of each succeeding screen 213 is the day after the ending pay or time period 205 of the preceding screen 213.

Figure 9:
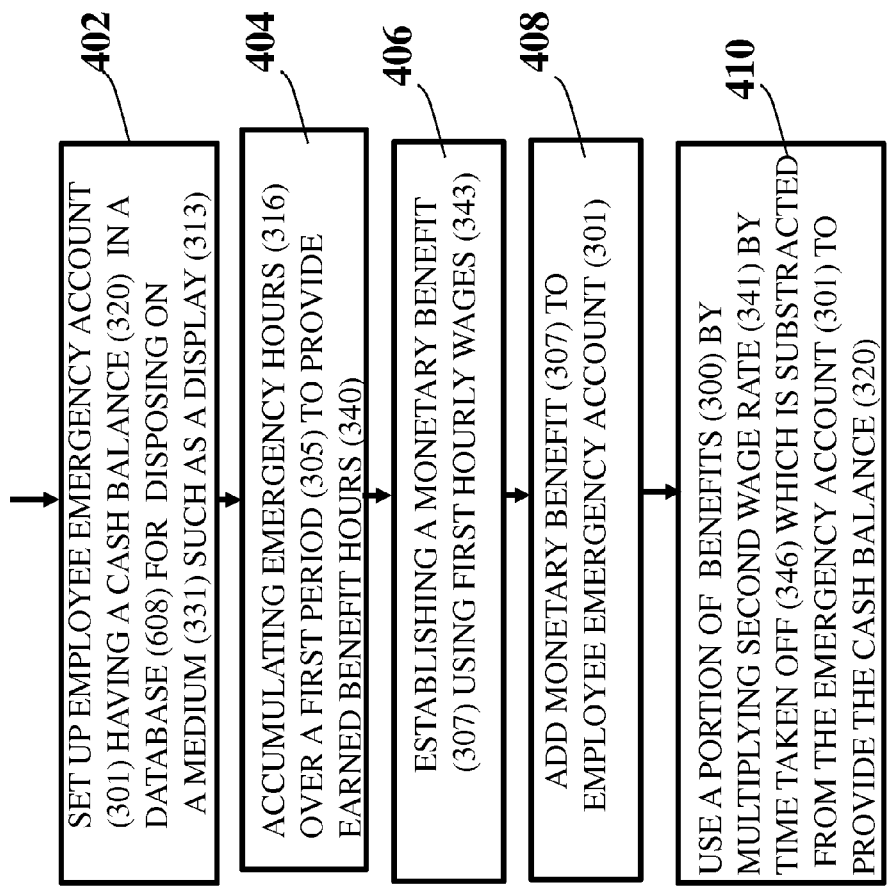
FIG. 9 is a block diagram of yet another embodiment of the steps for determining employee benefits.

FIG. 9 is a block diagram illustrating the steps for determining employee benefits 300. In step 402, a cash or emergency account 301 is established having a balance 320 based on monetary value such as dollars in the database 608. The balance 320 can be placed on a medium 331 such as printing on a paystub 329. The medium 331 can further include displaying on a computer screen or display 313. The emergency account 301 can be used for expenses including mortgage, medical, car insurance, utility debts or any other expenses as agreed by the employer. Similar to FIG. 6, employee benefits 300 are set up to be dispersed through the employee emergency account 301 using cash. In step 404, emergency hours 316 are accumulated over a first period or increment of time 305 to provide earned benefit hours 340 in the database 608. The first period of time 305 can include the units of time as discussed under FIG. 3. The quantity of earned benefit hours 340 can be a function of a predetermined weighted factor such as the employee's longevity with an organization. In step 406, the earned benefit hours 340 are converted into a monetary benefit 307 in the database 608. The monetary benefit 307 can be calculated by multiplying earned benefit hours 340 by an employee's first hourly wage rate 343. This multiplication is for a first time period 305 for the hours of earned benefit hours 340 are accumulated. The result of the calculation is referred to as a monetary benefit 307 and is stored in the database 608. In step 408, the monetary benefit 307 is added to the employee emergency account 301 and stored in the database 608. In step 410, the employee uses a portion of the employee benefits 300 by multiplying a second hourly wage rate 341 by any time taken off 346. This results in a monetary benefit 307. The balance 320 of the employee emergency account 301 is reduced by subtracting the monetary benefit 307 from the employee emergency account 301 and is stored on the database 608. The steps 404 through 410 can be repeated over a plurality of time periods 305.

FIG. 10 illustrates the steps of the block diagram as shown in FIG. 9. The events or actions in column A of the table in FIG. 10 are chronologically laid out similar to FIGS. 4 and 6. The balance 320 of the emergency account 301 is set up at $0.00 as shown in column G. In a time period 305 labeled 1, the employee earns two hours of earned benefit hours 340 as an accrued benefit shown in column D. A monetary benefit 307 of $20.00, in column F, is established by multiplying a wage rate 345 of the most current time period 305, shown in column C, by the two hours of earned benefit hours 340. The wage rate 345 is the amount the employee receives over an earlier or later time periods 305 and is referred to as a first 343 and second 341 wage rates, respectively. The monetary benefit 307 of $20.00 is added to the employee emergency account 301 as shown in column G. Over the following time periods 305 labeled 2 and 3 of FIG. 10, the employee earns two hours having a monetary benefit 307 of $20.00 for each of the respective time periods. Hence, as shown in column G of the time period 305 labeled 4, the total of the employee cash account is $60.00. The wage rate 345 can be the first 343 or second 341 wage rate with respect an earlier or later time period 305. It is important to note monetary benefit 307 calculation uses the most current or the first wage rate 343 of $10 per hour as shown in column C. In the time periods labeled 4 and 5, the wage rate 345 is $15 per hour. A portion of the employee benefits 300 is used. This portion of the employee benefits 300 can be referred to as a monetary amount 338 and is calculated by multiplying the second hourly wage rate 341 by a time taken off 346. For example, one-third of an hour is the time taken off 346. Hence, the monetary amount 338 is $5.00 in the time period 305 labeled 5. The balance 320 of $55.00, in column G, of the emergency account 301 is calculated by subtracting the monetary amount 338 of $5.00 from the employee emergency account 301 of $60.00.

Figure 11:
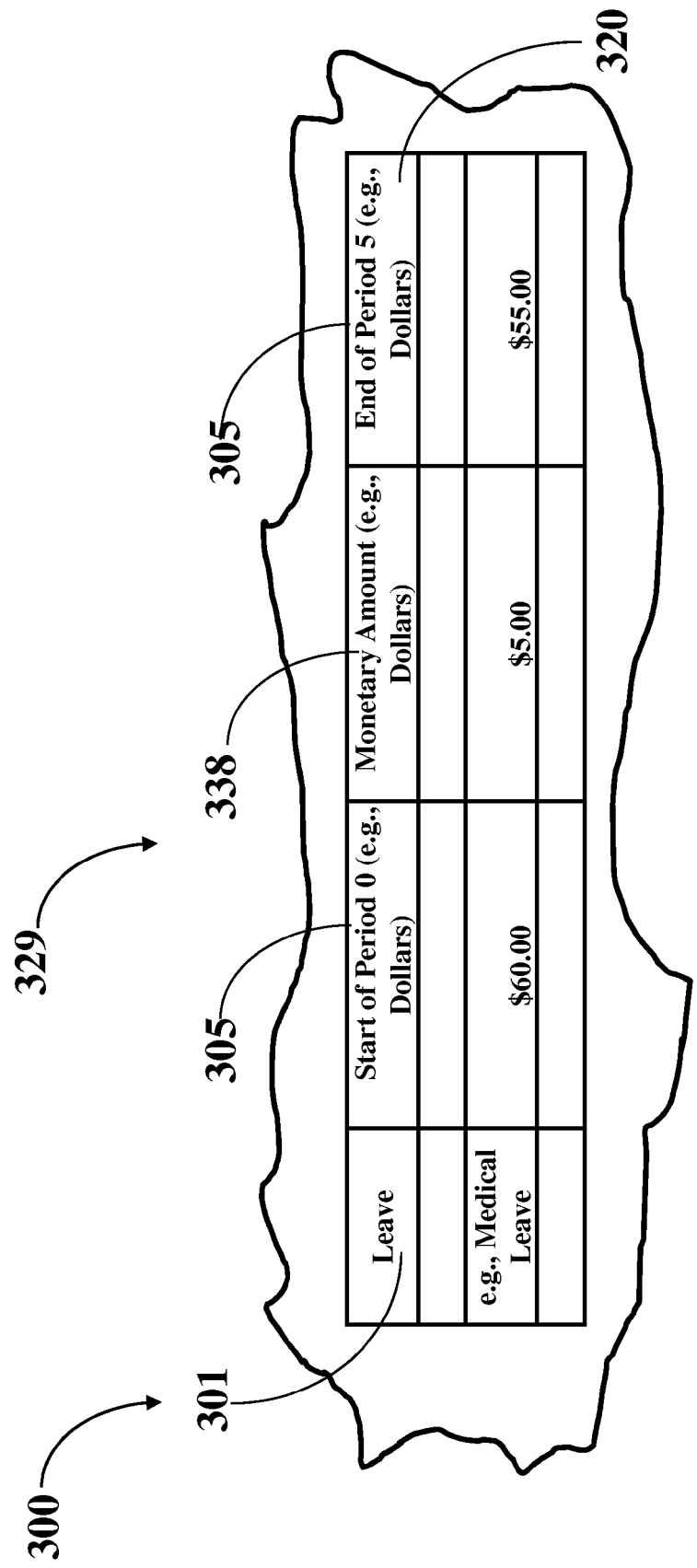
FIG. 11 is a diagram depicting medical leave on a portion of a paystub.

FIG. 11 depicts a portion of the medium 331 such as a paycheck or paystub 329 from the example shown in FIG. 10. In FIG. 11, the employee benefit 300 in the form of medical leave is included in the emergency account 301. The paystub 329 indicates that the monetary amount 338 of $5 is used over a time period 305 from period 0 to period 5. The balance 320 of medical leave is $55. It should be noted that the date of the beginning time period 305 of each succeeding paystub 329 is the day after the ending time period 305 of the preceding paystub 329.

By now it should be appreciated an improved method for establishing employee benefits is provided. This method provides a more accurate method valuing employee benefits. Further, this method can save employers costs by controlling the cost of accrued benefits to employees.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

The invention I claim is:

1. A method of determining benefits, comprising:
providing a cash account for an employee and using a computer for processing data acting on a database and having a balance;
generating earned benefit hours by accruing paid-time-off hours over a first time period using electronic communications on the computer;
generating a monetary benefit by multiplying a first hourly wage rate of electronic data on the computer by the earned benefit hours and storing on the database, and adding the monetary benefit to the cash account as electronic data on the computer;
generating a monetary amount by using paid-time-off hours through electronic communications by multiplying a second hourly wage rate by a time taken off over a second time period and storing on the database, and subtracting the monetary amount from the cash account through electronic communication on the computer to provide an update of the balance and the second hourly wage rate is greater than the first hourly wage rate and;
outputting the balance of the cash account electronic data from the computer onto a medium.

2. The method of claim 1, wherein disposing on the medium comprises printing the balance of the cash account on a paystub.

3. The method of claim 1, wherein adding the monetary amount to the cash account comprises increasing the cash account by using the employee first hourly wage.

4. The method of claim 1, wherein subtracting the monetary amount from the cash account comprises decreasing the monetary amount of the cash account by using the employee second hourly wage.

5. The method of claim 1, wherein disposing on the medium comprises displaying the balance of the cash account on a computer screen.

* * * * *